United States Patent [19]
Jeon

[11] Patent Number: 6,035,263
[45] Date of Patent: Mar. 7, 2000

[54] DEVICE FOR TESTING PRODUCT USING COMMUNICATION PORTS OF PERSONAL COMPUTER

[75] Inventor: Byeung-Gueon Jeon, Suwon, Rep. of Korea

[73] Assignee: SamSung Electronics Co., Ltd., Suwon, Rep. of Korea

[21] Appl. No.: 09/092,252

[22] Filed: Jun. 5, 1998

[30] Foreign Application Priority Data

Jun. 5, 1997 [KR] Rep. of Korea ...................... 97-23253

[51] Int. Cl.[7] .............................. G05B 19/00; G06F 11/00
[52] U.S. Cl. .......................... 702/122; 702/113; 702/121; 73/11.01; 73/865.9
[58] Field of Search .................................... 702/122, 121, 702/113; 364/528.1; 73/11.01, 865.9

[56] References Cited

U.S. PATENT DOCUMENTS

| | | |
|---|---|---|
| 4,078,259 | 3/1978 | Soulsby et al. . |
| 4,807,161 | 2/1989 | Comfort et al. . |
| 5,131,092 | 7/1992 | Sackmann et al. . |
| 5,220,522 | 6/1993 | Wilson et al. . |
| 5,245,704 | 9/1993 | Weber et al. . |
| 5,251,302 | 10/1993 | Weigl et al. . |
| 5,307,463 | 4/1994 | Hyatt et al. . |
| 5,485,590 | 1/1996 | Hyatt et al. . |

*Primary Examiner*—Marc S. Hoff
*Assistant Examiner*—Hien Vo
*Attorney, Agent, or Firm*—Robert E. Bushnell, Esq.

[57] ABSTRACT

A device for testing a product includes: a programmable logic controller (PLC) for loading or unloading a mechanical part of a test target product at a regular position suitable to a test environment; a personal computer (PC) for performing bidirectional communication through communication ports by generating a test control signal in order to test the test target product; a loading detection unit which is connected to the communication port and to an output terminal of the programmable logic controller (PLC), and which detects whether the PLC loads the test target product, and which informs the detected information to the PC; an unloading control unit which is connected to the communication port and to an input terminal of the PLC, and which applies an unloading signal to the PLC by receiving a test completion signal through the communication port, and which unloads the test target product from the PLC, and an error alarm unit which receives an error generating signal reporting occurrence of an error when testing the product through the communication ports, and which alarms the error occurrence. As a result, the problem of correcting programs for measuring, controlling and testing, as used in the PC and the program of the PLC, can be solved, thereby reducing the economic burden in manufacturing the device for controlling the mechanical part of the product.

22 Claims, 2 Drawing Sheets

DEVICE FOR TESTING PRODUCT USING COMMUNICATION PORTS OF PERSONAL COMPUTER

CLAIM OF PRIORITY

This application makes reference to, incorporates the same herein, and claims all benefits accruing under 35 U.S.C. §119 from an application for DEVICE FOR TESTING PRODUCT USING COMMUNICATION PORTS OF PERSONAL COMPUTER earlier filed in the Korean Industrial Property Office on the of Jun. 5, 1997 and there duly assigned Ser. No. 23253/1997.

BACKGROUND OF THE INVENTION

1. Technical Field

The present invention relates to a device for testing a product using communication ports of a personal computer and, more particularly, to a device for testing a product using communication ports of a personal computer capable of insuring efficiency in testing the product by providing an interface between a programmable logic controller and the personal computer through either serial communication port (s) or parallel communication port(s) of the personal computer.

2. Related Art

Recently, in order to ensure objectivity and reliability in testing products in a manufacturing line, the efficiency and quality of the product is measured and tested to sort inferior goods by connecting a test instrument and a testing object to a personal computer (PC). Control values of each compartment of the product to be tested are adjusted so as to comply with normal values. Specifically, when testing the product, a programmable logic controller (PLC) loads/unloads a mechanical part of the product by receiving a command supplied by the personal computer in order to broad-based automation.

The PLC is a control device equipped with programmable logic which can prepare a test environment capable of easily measuring, controlling and/or detecting errors regarding an actual test target by receiving a test condition or a command which is supplied from the outside by an operator or the personal computer in testing the product. For example, in a continuous operation for testing the test target product using a conveyer system, the PLC regularly positions the mechanical part of the test target product to be tested, and loads the mechanical part so that the test instrument connected to the PC can perform the relevant test precisely and properly test measuring items. After the test is completed, the PLC unloads the test target product whose test is completed so as to load automatically a mechanical part of a next test target product to be tested.

When using the above PLC, the operation of manually loading or unloading the test target product as performed manually by the operator, is excluded and unmanned automation is realized, thereby maximizing working efficiency.

In order to exchange control authority between the PC and PLC, it is essential to establish mutual interface between them. To interface between the PC and PLC, a communication unit is used.

However, as unmanned automation is realized by using a PLC which is dependent upon the interface by the communication unit, there is an economic burden in manufacturing the control device, such as the PLC, for controlling the mechanical part of the product. The control device for controlling the mechanical part of the product using a communication unit is different from other equipment which do not use the communication unit. Moreover, as the communication unit is used, the programs for measuring, controlling and testing as used in the PC, and the program of the PLC, should be corrected. In the case where a communication unit is not used, since the interface is not set between the PC and the PLC, unmanned automation is not realized.

The following patents are considered to be representative of the prior art relative to the use of programmable logic controllers, but are burdened by the disadvantages set forth herein: U.S. Pat. No. 4,078,259 to Soulsby et al., entitled *Programmable Controller Having A System For Monitoring The Logic Conditions At External Locations*, U.S. Pat. No. 4,807,161 to Comfort et al., entitled *Automatic Test Equipment*, U.S. Pat. No. 5,131,092 to Sackmann et al., entitled *Communication System Enabling Programmable Logic Controllers Access To Host Computer Tasks And Host Computer Access To Programmable Logic Controllers Without Polling*, U.S. Pat. No. 5,220,522 to Wilson et al., entitled *Peripheral Data Acquisition, Monitor, And Control Device For A Personal Computer*, U.S. Pat. No. 5,245,704 to Weber et al., entitled *System For Sharing Data Between Microprocessor Based Devices*, U.S. Pat. No. 5,251,302 to Weigl et al., entitled *Network Interface Board Having Memory Mapped Mailbox Registers Including Alarm Registers For Storing Prioritized Alarm Messages From Programmable Logic Controllers*, U.S. Pat. No. 5,307,463 to Hyatt et al., entitled *Programmable Controller Communication Module*, and U.S. Pat. No. 5,485,590 to Hyatt et al., entitled *Programmable Controller Interface Module Which Is Configurable By A Removable Memory Cartridge*.

SUMMARY OF THE INVENTION

Therefore, it is an object of the present invention to provide a device for testing a product using communication ports of a personal computer (PC).

It is an additional object of the invention to provide a testing device which is capable of insuring efficiency in testing the product.

It is also an additional object of the invention to provide a testing device which directly controls a programmable logic controller (PLC) through the PC by providing an interface between the PLC and the PC through serial communication port(s) or parallel communication port(s) which are communication ports of the PC.

In order to achieve the above objects, the device for testing the product includes: a PLC for loading or unloading a mechanical part of the test target product at a regular position suitable to a test environment; and a PC for measuring and testing quality and performance of the test target product to sort inferior goods by generating a test control signal for testing the test target product and performing bidirectional communication through the communication port, and for adjusting control values of each compartment of the product to be tested so as to comply with the regularity. The device for testing the product further includes: a loading detection unit which is connected to the communication port and to an output terminal of the PLC, and which detects whether the PLC loads the test target product and provides the detected information to the PC; an unloading control unit which is connected to the communication port and to an input terminal of the PLC, and which applies an unloading signal to the PLC by receiving a test completion signal through the communication port, and which unloads the test target product from the PLC; and an error alarm unit which receives an error generating signal informing of an occurrence of an error when testing the product through the communication port, and which alarms on occurrence of the error.

The communication port is either a serial communication port or a parallel communication port of the PC, and it is preferable to interface between the PLC and PC through the communication port. Specifically, it is preferable to use an RS-232C serial communication port.

The RS-232C is a standard for mutually connecting circuit terminal devices such as a data terminal device or a modem, and the RS-232C standard is established as a recommendation standard (RS) of the Electronic Industries Association (EIA) which is a cartel in the field of the electronic industry in the United States having the objective of making up and maintaining a standard for electronic products. It is used as a standard interface for the mutual communication of data and control signals between a central processing unit and peripheral devices. An interface suitable to this standard is indicated as an 'RS-232C interface'.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The objects, characteristics and advantages of the above-described invention will be more clearly understood through the preferable embodiments referring to the attached drawings.

A preferred embodiment of a device for testing a product using communication ports of a personal computer (PC) according to the present invention is explained with reference to FIG. 1.

Figure 1:
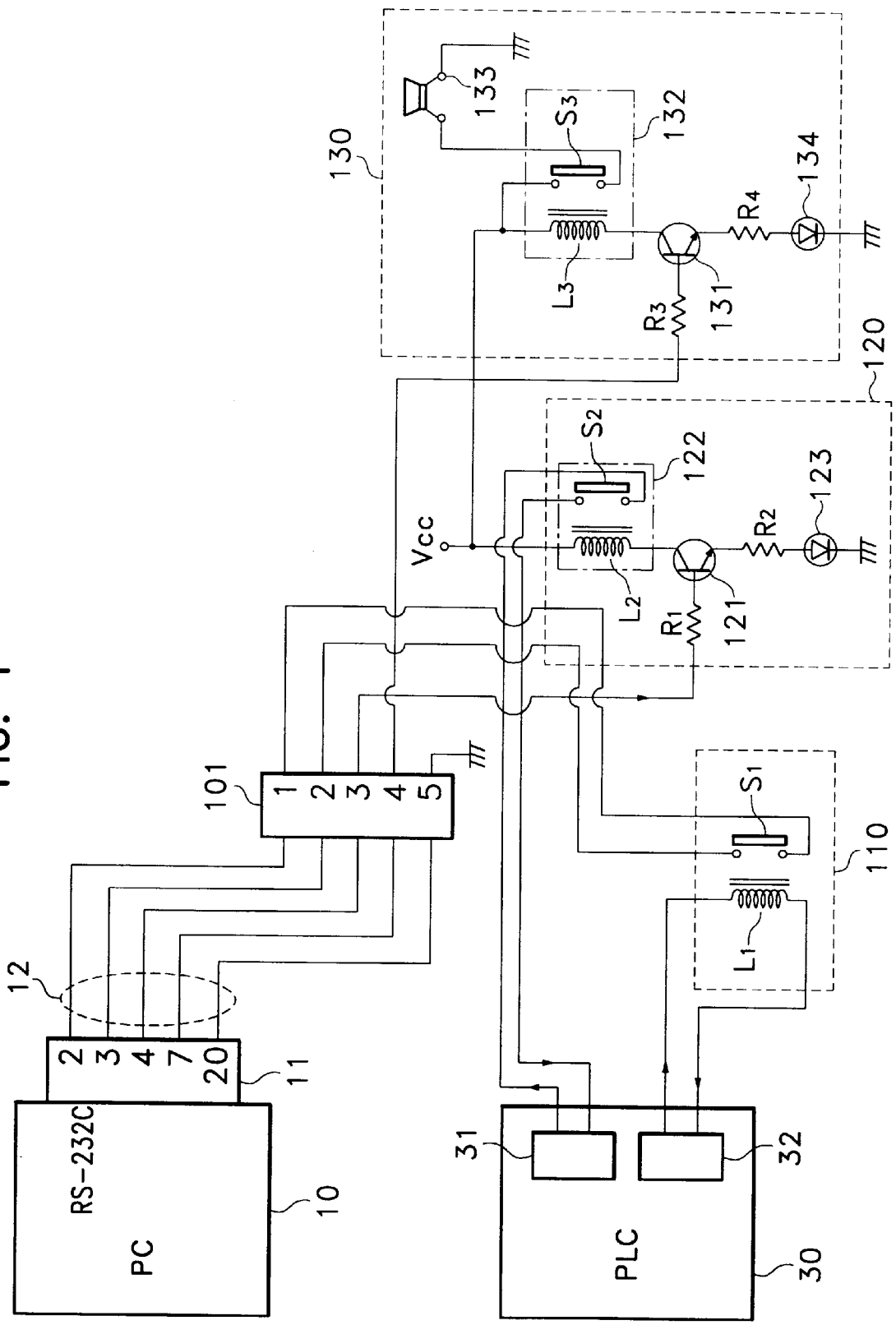
FIG. 1 is a circuit diagram illustrating a preferred embodiment of a device for testing a product using communication ports of a personal computer according to the present invention.

FIG. 1 is a circuit diagram illustrating a preferred embodiment of the invention. As shown in the drawing, the device for testing the product includes: a programmable logic controller (PLC) 30 for loading or unloading a mechanical part of a test target product (not illustrated) at a regular position suitable as a test environment; a personal computer (PC) 10 for measuring and testing quality and performance of the test target product so as to sort interior goods by generating a test control signal for testing the test target product and performing bidirectional communication through a serial communication port 11 having 25 pins, and for adjusting control values of each compartment of the product to be tested so as to comply with regularity; a loading detection unit 110 which is connected to the serial communication port 11 having 25 pins through a serial communication port 101 having 9 pins, and to an output terminal 32 of the PLC 30, and which detects whether the PLC 30 has loaded the test target product and has reported the detected information to the PC 10; an unloading control unit 120 which is connected to the serial communication port 11 having 25 pins through the serial communication port 101 having 9 pins, and to an input terminal 31 of the PLC 30, and which applies an unloading signal to the PLC 30 by receiving a test completion signal through the communication ports 11 and 101, and which unloads the test target product from the PLC 30; and an error alarm unit 130 which receives an error detection signal informing of occurrence of an error through the communication ports 11 and 101, and which alarms the occurrence of the error.

The loading, detection unit 110 comprises a first relay which includes a first coil L1 and a first switch S1. Both ends of the first coil L1 are connected to the output terminal 32 of the PLC 30, respectively. One end of the first switch S1 is connected to a first pin of the serial communication port 101 having 9 pins and the other end is connected to a second pin of the serial communication port 101 having 9 pins. When the PLC 30 loads the test target product, the first coil L1 is turned on and the first switch S1 is also turned on. The PC 10 is informed through the communication ports 11 and 101 that the PLC 30 has loaded the test target product (not illustrated).

The unloading control unit 120 includes: an unloading switching unit 121 whose control terminal is connected to a third pin of the serial communication port 101 having 9 pins; a second relay 122 which is connected to the unloading switching unit 121, and which applies an unloading signal to the PLC 30 as the unloading switching unit 121 is turned on; and an unloading alarm unit 123 which is connected to the unloading switching unit 121, and which reports to the outside that the unloading signal is applied to the PLC 30 as the unloading switching unit 121 is turned on. The unloading switching unit 121 is a transistors, and the unloading alarm unit 123 is a display unit of visual type, such as a light emitting diode. The second relay 122 includes a second switch S2 having both ends connected to the input terminal 31 of the PLC 30, and a second coil L2 having one end connected to the one end of the unloading switching unit 121; and the other end connected to a power supply Vcc.

In addition, the error alarm unit 130 includes: an alarm switching unit 131 having a control terminal connected to a fourth pin of the serial communication port 101 having 9 pins; a third relay 132 which is connected to the alarm switching unit 131, and which is turned on as the alarm switching unit 131 is turned on, and which operates a sound generating device 133 informing of the occurrence of an error when testing the product; a light-emitting error alarm unit 134 which is connected to the alarm switching unit 131, and which is turned on as the alarm switching unit 131 is turned on, and which informs of the occurrence of an error by emitting a light when testing the product.

The error alarm switching unit 131 preferably comprises a transistor, and the light-emitting error alarm unit 134 preferably comprises a light emitting diode. The third relay 132 includes: a third switch S3 having one end connected to the power supply Vcc and another end connected to the sound generating device 133, and a third coil L3 having one end connected to the power supply Vcc and another end connected to the error alarm switching unit 131.

The relation between the serial communication port 11 having, 25 pins and the serial communication port 101 having 9 pins, which are in compliance with the RS-232C standard used in the preferred embodiment of the present invention, is explained. The arrangement of the pins in a 25-pin connector which is connected to the serial communication port 11 having 25 pins, and is a 9-pin connector which is connected to the serial communication port 101 having 9 pins, is illustrated in the following table.

| 25-pin connector | | 9-pin connector | |
|---|---|---|---|
| Pin No. | Signal Line | Pin No. | Signal Line |
| 1 | FG (Frame Ground) | 1 | CD |
| 2 | TXD (Transmit Data) | 2 | TXD (Transmit Data) |
| 3 | RXD (Receive Data) | 3 | RXD (Receive Data) |
| 4 | RTS (Request To send) | 4 | DTR (Data Terminal Ready) |
| 5 | CTS (Clear To Send) | 5 | SG (Signal Ground) |
| 6 | DSR (Data Set Ready) | 6 | DSR (Data Send Ready) |
| 7 | SG (Signal Ground) | 7 | RTS (Request To Send) |
| 8 | CD (Carrier Detect) | 8 | CTS (Clear To Send) |
| 15 | TXC (Transmit Clock) | 9 | RI (Ring Indicator) |
| 17 | RXC (Receive Clock) | | |
| 18 | TEST | | |
| 20 | DTR (Data Terminal Ready) | | |
| 22 | RI (Ring Indicator) | | |
| 23 | SS (Speed Select) | | |

The serial communication port 11 operating according to the RS-232C standard, determines the mutual connection through its 25-pin connector. However, since there are signal lines which are actually not used and occupy substantial space, the embodiment of the present invention often uses a 9-pin connector. In order to use both the connectors, pins having the same signal line can be connected, as will be shown in the following table.

In the preferred embodiment of the present invention, since only the signal lines of TXD (Transmit Data), RXD (Receive Data), RTS (Ready To Send), SG (Signal Ground) and DTR (Data To Ready) are required, the pins of these signal lines are connected to each other. In the embodiment, a fifth pin of the 9-pin connector is grounded.

| Pin No. (25-pin connector) | Pin No. (9-pin connector) | signal line |
|---|---|---|
| 2 | 1 | TXD (Transmit Data) |
| 3 | 2 | RXD (Receive Data) |
| 4 | 3 | RTS (Request To Send) |
| 7 | 5 | SG (Signal Ground) |
| 20 | 4 | DTR (Data To Ready) |

The operation of the preferred embodiment of the device for testing the product, using communication ports of the PC according to the present invention, having the above structure is explained with reference to FIG. 1.

First, the PC 10 periodically transmits a loading interrogation signal to the loading detection unit 110 through a second pin (TXD) of the serial communication port 11 having 25 pins and a first pin (TXD) of the serial communication port 101 having 9 pins.

When the PLC 30 loads the mechanical part of the test target product (not illustrated) at a position suitable as a test environment, the PLC 30 provides a control signal via the output terminal 32 of the PLC 30, informing the loading detection unit 110 that the mechanical part is loaded.

Accordingly, the loading detection unit 110 detects whether the PLC 30 has loaded the test target product, and then informs the PC 10 of the detected information accordingly.

In other words, when the PLC 30 loads the test target product, the first coil L1 of the loading detection unit 110 is turned on, and the first switch S1 is also turned on. At this time, the loading detection signal is provided to the PC 10 through a second pin (RXD) of the serial communication port 101 having 9 pins and a third pin (RXD) of the serial communication port 11 having 25 pins, thereby informing the PC 10 that the PLC 30 has loaded the test target product.

Subsequently, the PC 10 controls the testing instrument (not illustrated) so as to measure, test and control the test target product, and checks the performance and quality of the test target product. In addition, the PC 10 adjusts the control values of each compartment of the product to be tested so as to comply with normal values.

If an error occurs in testing the product, the PC 10 transmits an error detection signal to the error alarm unit 130 through a twentieth pin (DTR) of the serial communication port 11 having 25 pins and a fourth pin (DTR) of the serial communication port 101 having 9 pins. As the alarm switching unit 131 of the error alarm unit 130 is turned on, and the third switch S3 is also turned on, an alarm signal is generated by operating the sound generating device 133, and an alarms light is simultaneously generated by turning on the light emitting diode of the light-emitting error alarm unit are 134.

Finally, when the testing of the product is completed, the PC 10 transmits a test completion signal to the unloading control unit 120 through a fourth pin (RTS) of the serial communication port 11 having 25 pins and a third pin (RTS) of the serial communication port 101 having 9 pins. As the unloading switching unit 121 of the unloading control unit 120 is turned on, and the second switch S2 of the second relay 122 is also turned on, an unloading signal is provided through the input terminal 31 of the PLC 30. Simultaneously, the light emitting diode of the unloading alarm unit 123 is activated to indicate that the unloading signal provided to the PLC 30 is turned on, thereby generating the alarm light.

The PLC 30, which receives the unloading signal through the input terminal 31, unloads the test target product whose test is completed, and the PC 10 performs an initialization to test the next test target product.

Hereinafter, the method for testing the product using communication ports of the PC according to the present invention is explained with reference to FIGS. 1 and 2.

Figure 2:
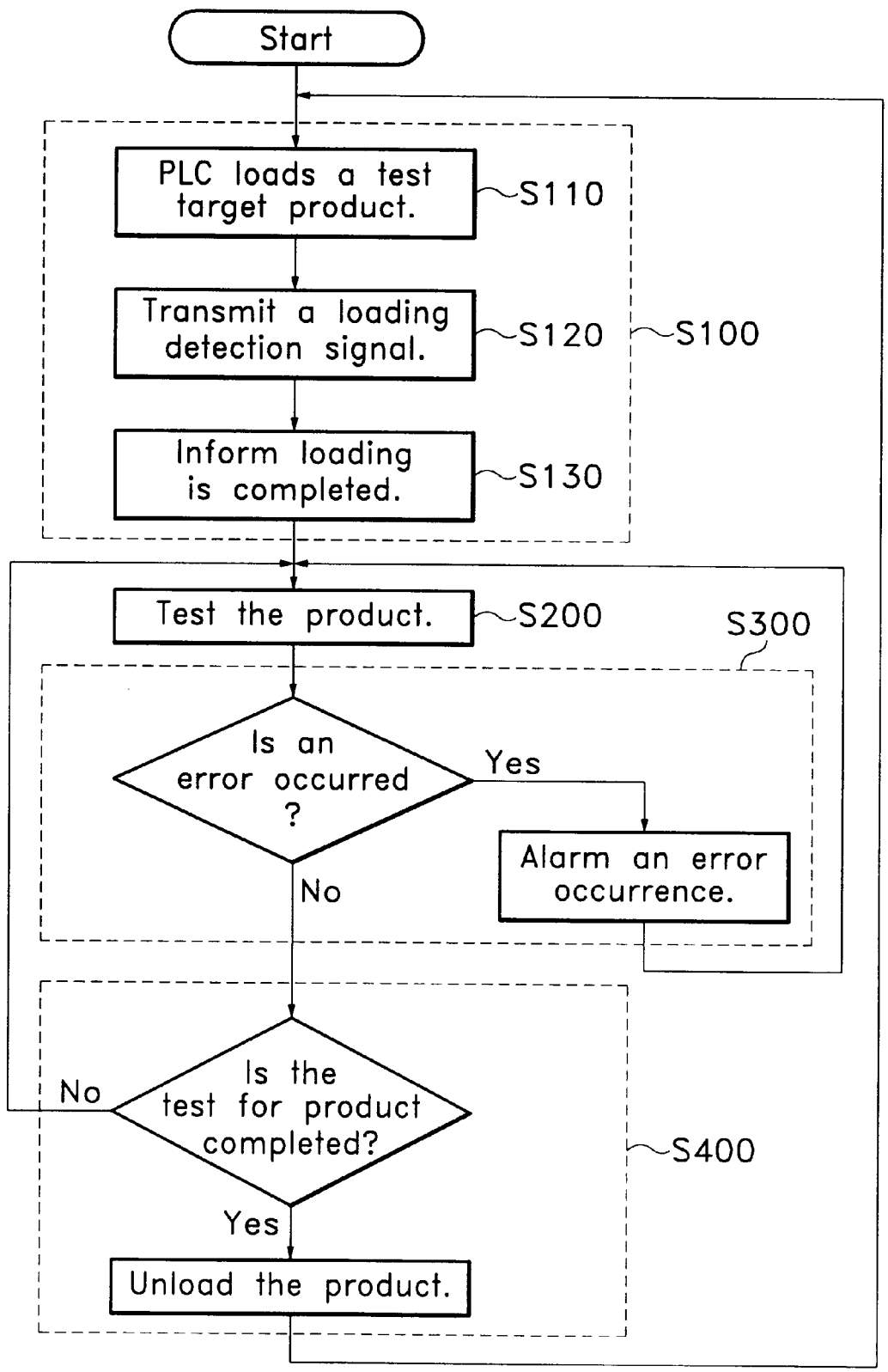
FIG. 2 is a flowchart illustrating a method for testing a product using communication ports of a personal computer according to the present invention.

FIG. 2 is a flowchart illustrating a method for testing the product using communication ports of the PC.

As shown in the drawing, the method for testing the product uses communication ports of the PC which, according to the present invention, controls the device for testing the product including the programmable logic controller (PLC) for loading or unloading the mechanical part of the test target product at a position suitable as a test environment. The personal computer (PC) measures and tests quality and performance of the test target product to sort inferior goods by generating a test control signal for testing the test target product, and for adjusting control values of each compartment of the product to be tested so as to comply with standards of regularity. The method includes the steps of, detecting whether the PLC 30 has loaded the test target product and reporting the detected information to the PC 10 (step 100); testing the product by checking performance and quality of the test target product by controlling the test instrument which measures, tests and adjusts the test target product, and by adjusting the control values of each compartment of the test target product to confirm with regularity using the PC 10, when the PLC completes the loading (step 200); alarming occurrence of an error when it occurs (step 300); and controlling an unloading so as to allow the PLC 30 to unload the test target product whose test is completed by providing the unloading signal to the PLC 30 through the communication ports 11 and 101 once testing the product in the PC 10 is completed (step 400).

The step 100 of detecting whether the PLC 30 loads the test target product includes the steps of: loading the mechanical part of the test target product by the PLC 30 at a regular position suitable to the test environment (step 110); transmitting the loading detection signal periodically to the PLC 30 through the second pin (TXD) of the serial communication port 11 having 25 pins and the first pin (TXD) of the serial communication port 101 having 9 pins (step 120); and informing that the loading is completed by returning the loading detection signal to the PC 10 through the output terminal 32 of the PLC 30 when the loading is completed (step 130).

The flow of the method for testing the product, using communication ports of the PC according, to the present invention having the above structure is explained, with reference to FIGS. 1 and 2.

First, it is determined whether the PLC 30 has loaded the test target product and the detected information is provided or reported to the PC 10 (step 100).

In other words, when the PLC 30 loads the mechanical part of the test target product at the position suitable to the test environment (step 110), the PC 10 transmits the loading detection signal periodically to the PLC 30 through the second pin (TXT) of the serial communication port 11 having 25 pins and the first pin (TXD) of the serial communication port 101 having 9 pins (step 120). When the loading is completed, the loading detection signal is returned to the PC 10 through the output terminal 32 of the PLC 30 (step 130).

Afterwards, at step 200, as the PLC 30 completes the loading the PC 10 checks the performance and quality of the test target product by controlling the test instrument which measures, tests and adjusts the test target product, and by adjusting the control values of each compartment of the test target product to conform with normal values.

If an error occurs during performance of step 200 of testing the product, the error occurrence is alarmed at step 300 of alarming the error.

When the test for the relevant test target product is completed, at step 400, the unloading signal is provided to the PLC 30 through the communication ports 11 and 101, and this allows the PLC 30 to unload the test target product whose test is completed.

As described above, the device for testing the product using communication ports of the PC, according to the present invention, checks the performance and quality of the test target product by generating a test control signal for testing the test target product, and by performing bidirectional communication through the communication ports, and the device adjusts the control values of each compartment of the test target product to conform with normal values. The device for testing the product includes: a programmable logic controller (PLC) for loading or unloading the mechanical part of the test target product at a position suitable as a test environment; a personal computer (PC) for performing bidirectional communication through communication ports by generating test control signal in order to test the test target product, a loading detection unit which is connected to the communication port and to the output terminal of the PLC, and which detects whether the PLC loads the test target product, and which reports the detected information to the PC; a unloading control unit which is connected to the communication port and to the input terminal of the PLC, and which provides the unloading signal to the PLC by receiving the test completion signal through the communication port, and which unloads the test target product from the PLC; and an error alarm unit which receives the error generating signal reporting the occurrence of an error when testing the product through the communication ports, and which alarms the occurrence of the error. As a result, the problem of correcting programs for measuring, controlling and testing as used in the PC, and the program of the PLC, is solved, thereby reducing the economic burden in manufacturing the device for controlling the mechanical part of the product. In addition, the problem which occurs when the control device for controlling the mechanical part of the product becomes different from another equipment, since it uses the communication unit, is also solved.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A device for testing a test target product, comprising:
    programmable logic controller (PLC) means for loading and unloading a mechanical part of said test target product at a regular position for a test;
    personal computer (PC) means for performing bidirectional communication with said test target product through a communication port to test said test target product, and for generating a test completion signal when testing of said test target product is completed;
    loading detection means connected to said communication port and to an output terminal of said PLC means for detecting whether said PLC means loads said test target product and for reporting loading detection information to said PC means; and
    unloading control means connected to said communication port and to an input terminal of said PLC means for providing an unloading signal to said PLC means when the test completion signal is received through said communication port from said PC means.

2. The device of claim 1, further comprising alarm means for receiving, through said communication port, an error signal representing an error occurrence when testing said test target product, and for reporting the error occurrence to a user by at least one of visual means and audible means.

3. The device of claim 2, wherein said alarm means comprises:
    an alarm switching unit having a control terminal connected to said communication port and being actuable to an operative state during the error occurrence;
    a relay turned on to an operative state when said alarm switching unit is actuated to the operative state; and
    a sound generating device operated by said relay to inform the user of the error occurrence when testing said test target product.

4. The device of claim 3, wherein said alarm means further comprises:

a light-emitting error alarm unit which is connected to said alarm switching unit, and which is actuated to an operative state when said alarm switching unit is actuated to the operative state, and which reports the error occurrence to the user by emitting light when testing said test target product.

5. The device of claim 1, wherein said communication port is one of a serial communication port and a parallel communication port of said PC means.

6. The device of claim 5, wherein said serial communication port comprises an RS-232C port.

7. The device of claim 1, wherein said loading detection means comprises a relay including:
a coil connected to said PLC means; and
a switch having one end connected to a transmitting pin of said communication port and another end connected to a receiving pin of said communication port.

8. The device of claim 1, wherein said unloading control means comprises:
an unloading switching unit having a control terminal connected to said communication port for receiving the test completion signal, and responsive thereto for being switched to an operative state; and
a relay providing an unloading signal to said PLC means when said unloading switching unit is switched to the operative state.

9. The device of claim 8, wherein said unloading control means further comprises an unloading alarm unit for reporting to the user that said unloading signal is provided to said PLC means when said unloading switching unit is switched to the operative state.

10. The device of claim 9, wherein said unloading alarm unit comprises at least one of a visual display device and a sound-generating device.

11. The device of claim 7, wherein said PLC means activates said coil to an operative state when said test target product is loaded, and said switch is responsive to activation of said coil to the operative state for closing a circuit between the transmitting pin and the receiving pin of said communication port, thereby notifying said PC means via said communication port that said test target product is loaded.

12. A device for testing a test target product, comprising:
programmable logic controller (PLC) means for loading and unloading a mechanical part of said test target product at a regular position for a test;
personal computer (PC) means for generating a test control signal and performing bidirectional communication with said test target product through a communication port to test said test target product;
loading detection means connected to said communication port and to an output terminal of said PLC means for detecting whether said PLC means loads said test target product and for reporting the loading detection information to said PC means; and
unloading control means connected to said communication port and to an input terminal of said PLC means for providing an unloading signal to said PLC means when receiving a test completion signal through said communication port,
wherein said loading detection means comprises a relay which includes a coil connected to said PLC means, and a switch having one end connected to a transmitting pin of said communication port and another end connected to a receiving pin of said communication port.

13. The device of claim 12, further comprising alarm means for receiving an error signal representing an error occurrence when testing said test target product and for reporting the error occurrence to a user.

14. The device of claim 13, wherein said alarm means comprises:
an alarm switching unit having a control terminal connected to said communication port and actuable to an operative state during the error occurrence;
a relay switched to an operative state when said alarm switching unit is actuated to the operative state; and
a sound generating device operated by said relay to inform the user of the error occurrence when testing said test target product.

15. The device of claim 14, wherein said alarm means further comprises:
a light-emitting error alarm unit which is connected to said alarm switching unit, which is actuated to an operative state when said alarm switching unit is switched to the operative state, and which reports the error occurrence to the user by emitting light when testing said test target product.

16. The device of claim 12, wherein said PLC means activates said coil to an operative state when said test target product is loaded, and said switch is responsive to activation of said coil to the operative state for closing a circuit between the transmitting pin and the receiving pin of said communication port, thereby notifying said PC means via said communication port that said test target product is loaded.

17. A device for testing a test target product, comprising:
programmable logic controller (PLC) means for loading and unloading mechanical part of said test target product at a regular position for a test;
personal computer (PC) means for generating a test control signal and performing bidirectional communication with said test target product through a communication port to test said test target product;
loading detection means connected to said communication port and to an output terminal of said PLC means for detecting whether said PLC means loads said test target product and for reporting the loading detection information to said PC means; and
unloading control means connected to said communication port and to an input terminal of said PLC means for providing an unloading signal to said PLC means when receiving a test completion signal through said communication port;
wherein said unloading control means comprises an unloading switching unit having a control terminal connected to said communication port for receiving the test completion signal, and responsive thereto for being switched to an operative state, and a relay providing an unloading signal to said PLC means when said unloading switching unit is switched to the operative state.

18. The device of claim 17, wherein said unloading control means further comprises an unloading alarm unit for reporting to the user that said unloading signal is provided to said PLC means when said unloading switching unit is switched to the operative state.

19. The device of claim 18, wherein said unloading alarm unit comprises at least one of a visual display device and a sound-generating device.

20. The device of claim 17, further comprising alarm means for receiving an error signal representing an error occurrence when testing said test target product and for reporting the error occurrence to a user.

21. The device of claim 20, wherein said alarm means comprises:
- an alarm switching unit having a control terminal connected to said communication port an actuable to an operative state during the error occurrence;
- a relay switched to an operative state when said alarm switching unit is actuated to the operative state; and
- a sound generating device operated by said relay to inform the user of the error occurrence when testing said test target product.

22. The device of claim 21, wherein said alarm means further comprises:
- a light-emitting error alarm unit which is connected to said alarm switching unit, which is actuated to an operative state when said alarm switching unit is switched to the operative state, and which reports the error occurrence to the user by emitting light when testing said test target product.

* * * * *